United States Patent [19]
Stewart et al.

[11] 3,826,198
[45] July 30, 1974

[54] PORTABLE RAILWAY CAR MOVER

[75] Inventors: T. Dale Stewart, New Kensington; Thomas D. Stewart, Murrysville, both of Pa.; Charles F. Hautau, Oxford, Ohio

[73] Assignee: Shippers Automation, Inc., New Kensington, Pa.

[22] Filed: Feb. 14, 1972

[21] Appl. No.: 225,907

[52] U.S. Cl.............. 105/90 A, 105/26.1, 214/340, 254/35
[51] Int. Cl...... B61b 13/12, B61b 15/00, B61j 3/12
[58] Field of Search............ 60/97 SE; 105/26.1, 27, 105/90 R, 90 A, 162, 462; 188/68, 170; 254/35, 38; 214/340

[56] References Cited
UNITED STATES PATENTS

| | | | |
|---|---|---|---|
| 1,913,792 | 6/1933 | Christiansen | 254/35 X |
| 2,989,007 | 6/1961 | Stewart | 105/90 R |
| 3,120,741 | 2/1964 | Stewart | 60/97 SE |
| 3,232,240 | 2/1966 | Stewart | 105/162 X |

FOREIGN PATENTS OR APPLICATIONS 940,533  3/1956  Germany .............................. 254/35

Primary Examiner—Robert G. Sheridan
Assistant Examiner—Howard Beltran

[57] ABSTRACT

Power attachment made to the lower portion of a rail car wheel, at the outer side thereof, to render a railway car self-propellable bidirectionally. The structure includes a roller-carrying C-clamp which, from a side entry position relative to the car to be moved, draws in with a power clamping action against the tread of the wheel at that side so as to interpose first rollers between the jaws of the clamp and the wheel, and other rollers between the clamp and the rail beneath the car wheel. The structure also includes a power unit for bidirectionally driving the first rollers, for collapsing the C-clamp under power to partially support the wheel on the rail, and for bidirectionally driving a set of extendible ground transport wheels which are provided for the structure and which, when extended from a retracted position, render the attachment self-propellable on the ground independently of the car and the rail.

What are primarily involved here are the feature of the power unit's set of ground wheels being in a triangular arrangement for platform stability, the feature of one such ground wheel being a dirigible wheel which is turned in one direction to cooperate as part of the ground wheel set and in another direction in a cooperative, support providing relationship with said other rollers, and the feature of means for individually controlling wheel elevation of the set of ground wheels.

11 Claims, 8 Drawing Figures

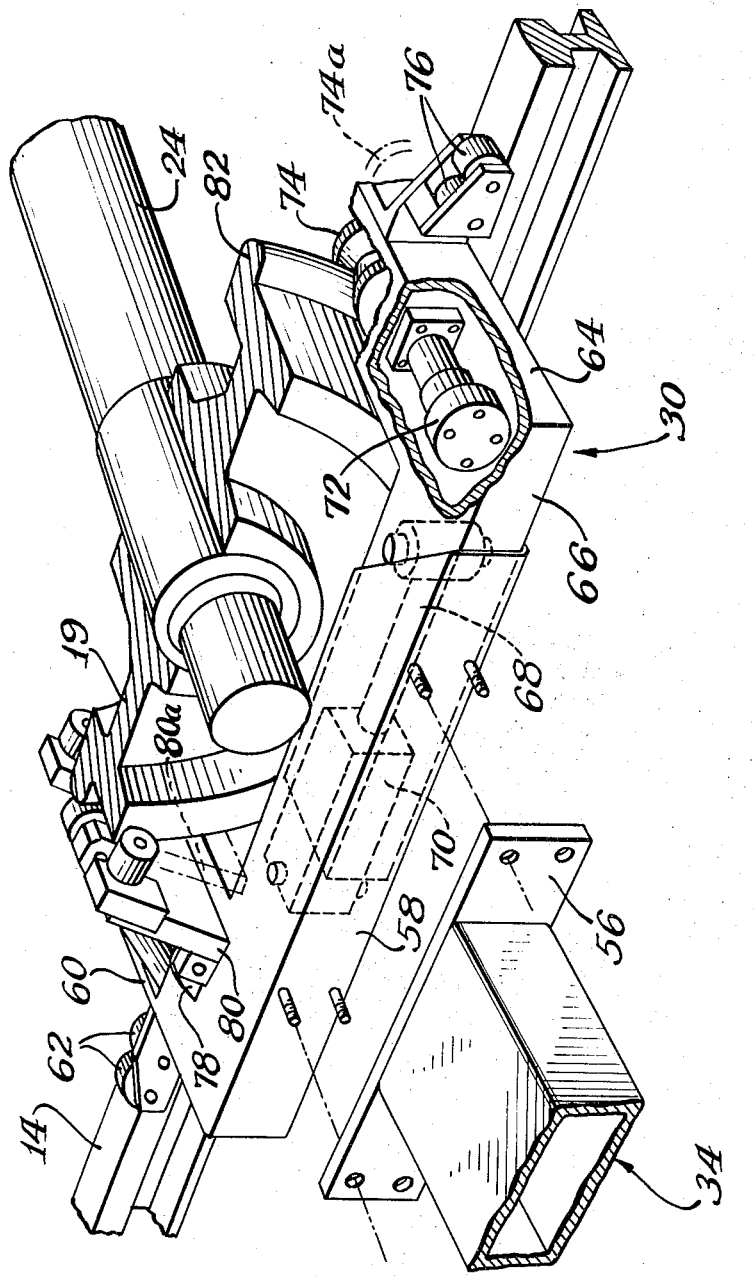

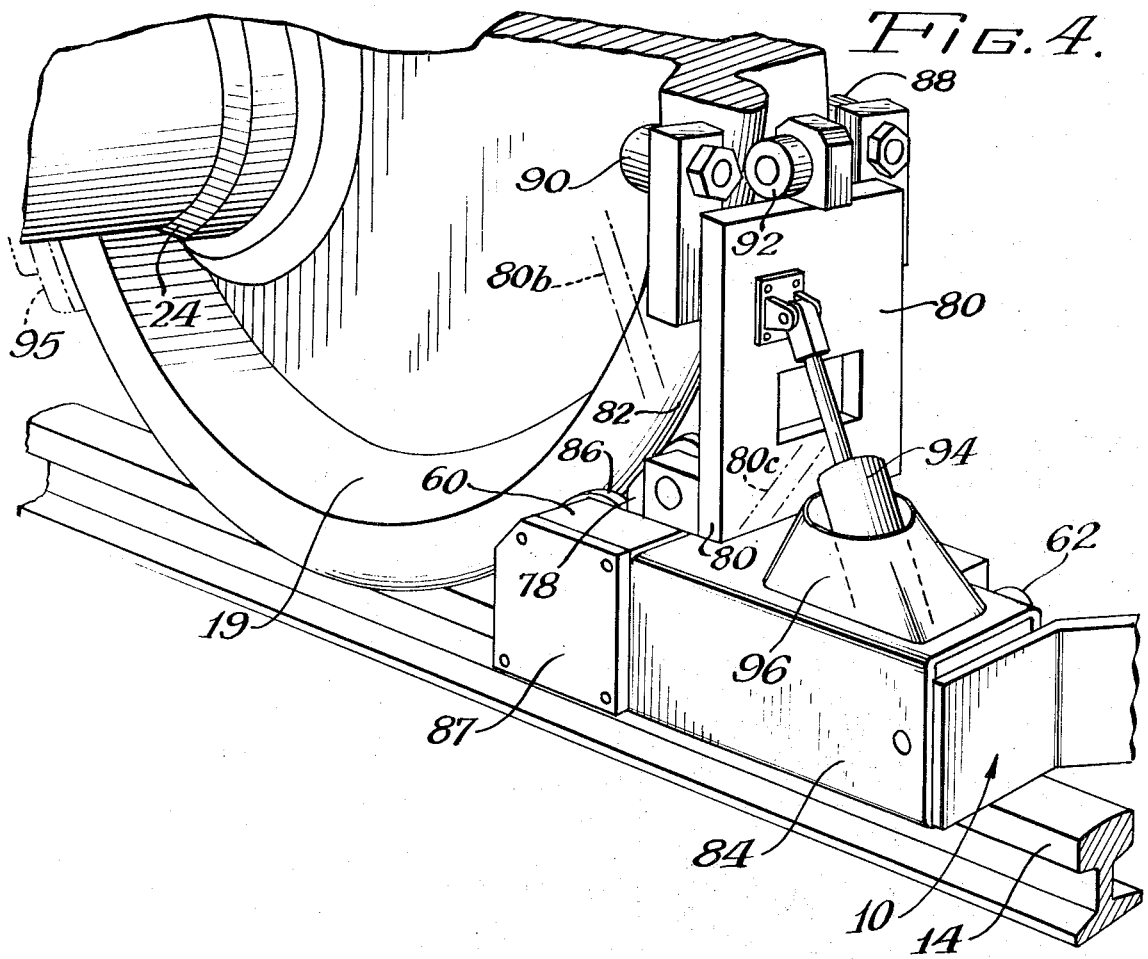
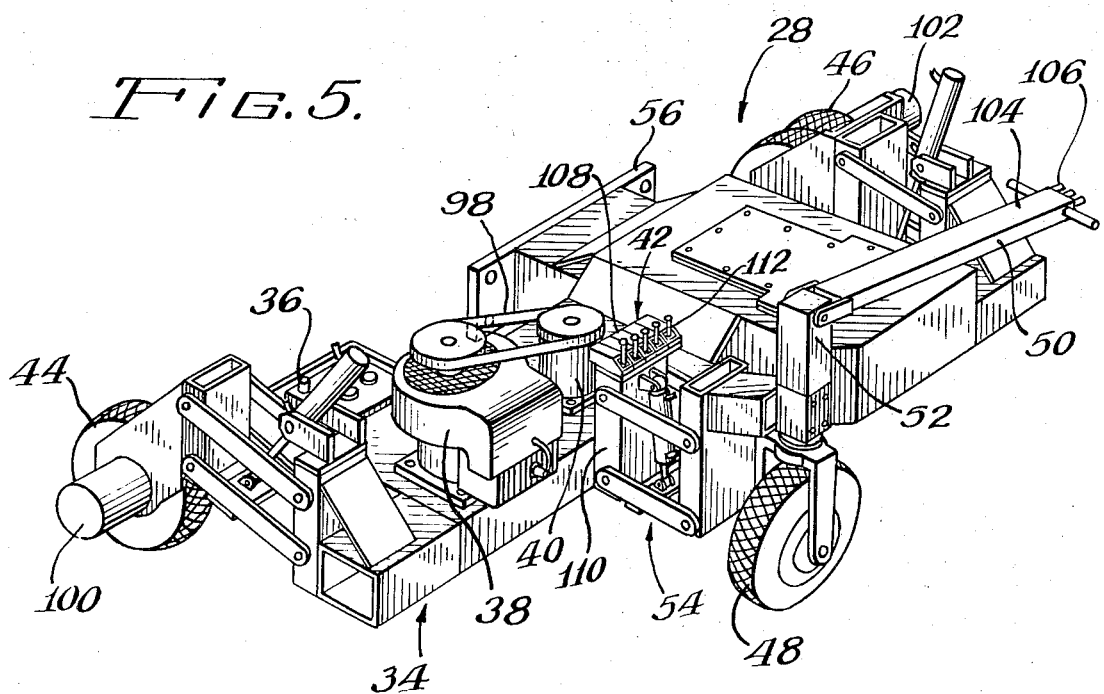

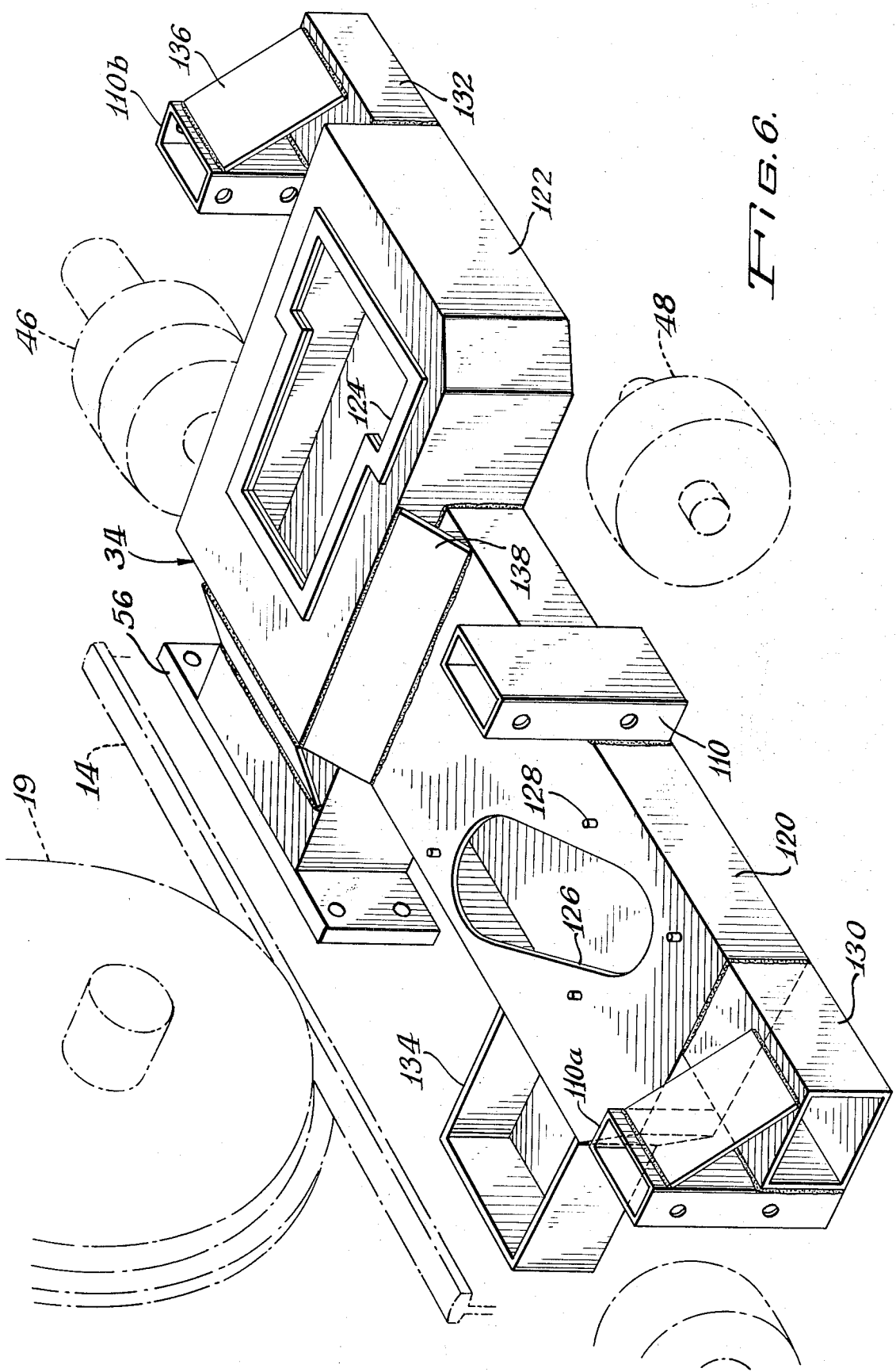

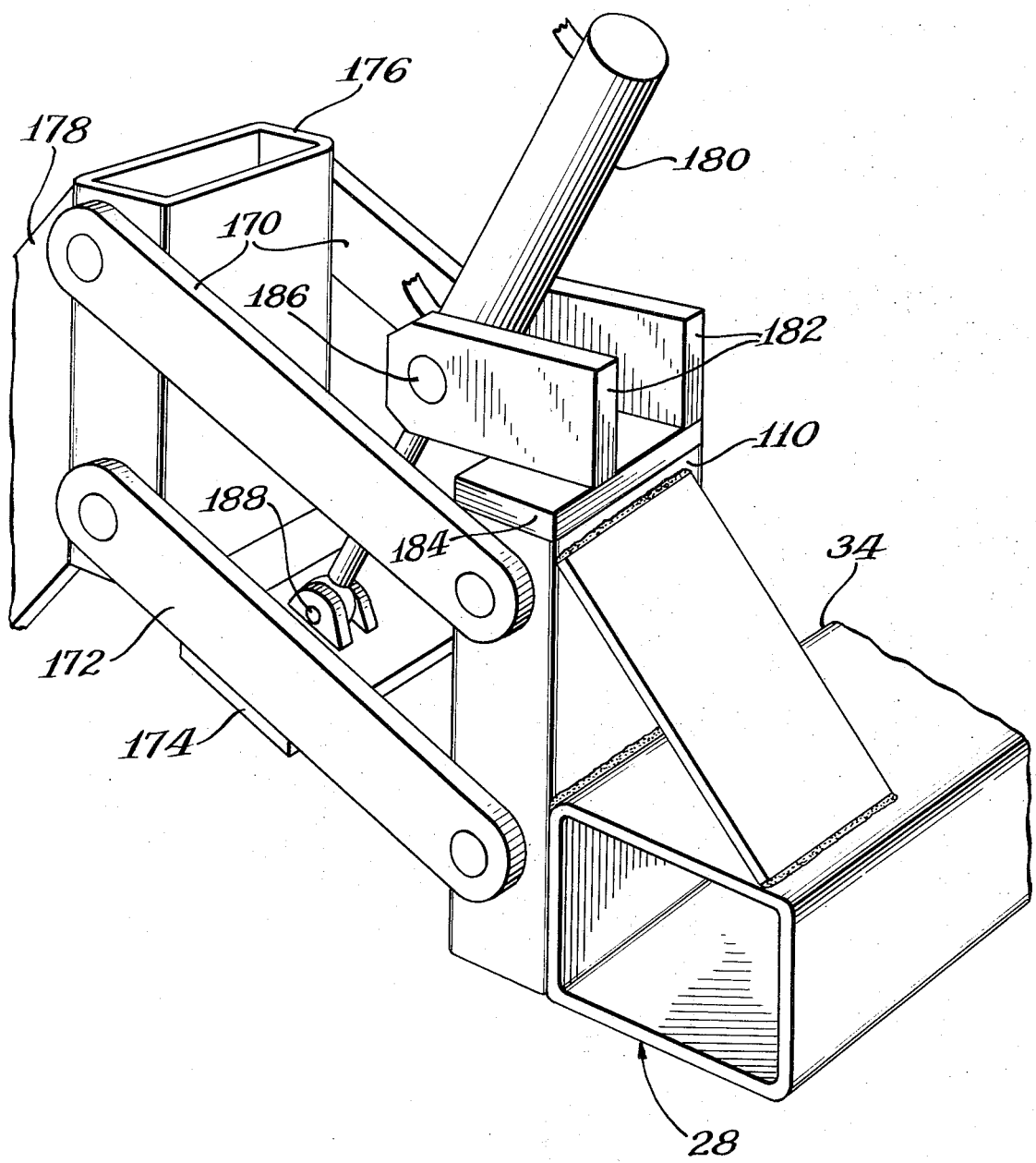

PORTABLE RAILWAY CAR MOVER

SPECIFICATION

The present invention is an improvement over the car mover patented in Stewart U.S. Pat. Nos. 2,989,007 and 3,120,741.

This application relates generally to a side entry, wheel clamping device which is self supporting when clamped to a railway car wheel and which has self-contained power delivery means for applying torque directly to the wheel, so as to move the railway car when and in the direction desired. The application relates more particularly to such a device which is self powered so as to be independently transportable to and about the car to be moved, and which in a side position can be clamped in rolling contact to one wheel of any pair of wheels on the car, the wheels of each pair being the usual flanged wheels located at opposite sides of the car from one another and provided with a solid axle therebetween.

According to practice in the past, side entry tire lifts or dollies are employed for jacking up and cradling a vehicle wheel, or cylindrical objects generally, in a lifted position in order that the wheel or the end of the object will not drag when the vehicle or object is externally shoved about. The lifted position is off of and completely free from the supporting ground or rail surface, so that it is even the practice in some but not all cases for the wheel or cylindrical object to be static as long as in the lifted position. At all events, the wheel will have lost whatever frictional contact it could have afforded. The past problem with such a lifted wheel, in a stationary condition or otherwise, is that it performed none of the tractive effort, all of which developed upon customarily small casters or rollers provided on the underside of the lifter or dolly.

Our car mover device materially reduces or largely eliminates the foregoing problem, being readily detached or applied to a selected one of several flanged wheels available on the car and being self supporting, when applied, without lifting the selected car wheel from the track on which the car is to be moved, all as will now be explained in detail. Various features, objects, and advantages will either be specifically pointed out or become apparent when, for a better understanding of the invention, reference is made to the following description taken in conjunction with the accompanying drawings which show a preferred embodiment thereof, and in which:

FIG. 3 is an isometric elevational showing, viewed from the outer side, of the clamped together C-frame of the mover and clamped wheel of the car to be moved;

FIG. 4 is an isometric rear elevational view of the C-frame applied to a car wheel, showing the positions of a wheel engaging arm on the C-frame for stabilizing the mover in a horizontal plane;

FIG. 5 is a perspective, rear elevational view of the frame-mounted power unit alone;

FIG. 6 is an isometric rear elevational view of the power unit of FIG. 5, but with portions omitted to show details of the power unit frame;

FIG. 7 is similarly an isometric rear elevational view, showing a detail of FIG. 5 to larger scale.

Figure 1:
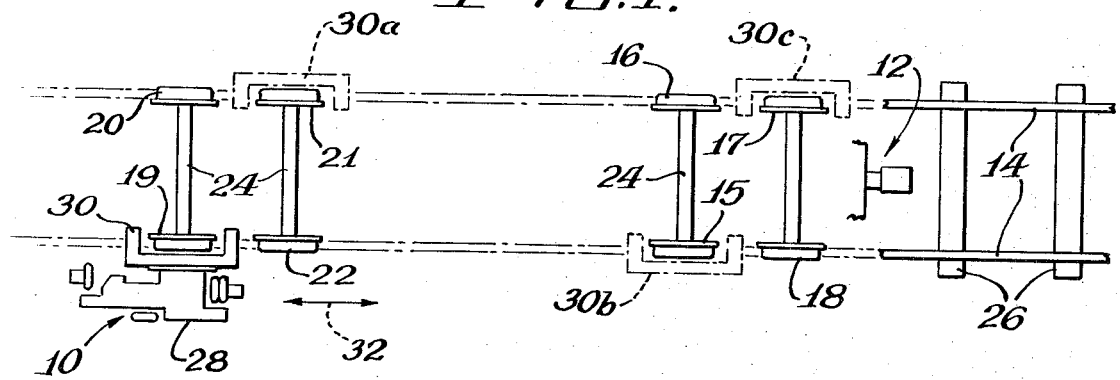
FIG. 1 is a top plan view of a schematically shown railway car, and a mover applied thereto embodying the present invention.

More particularly in FIG. 1, the present car mover device 10 is shown applied to a freight railway car 12 of standard construction supported on two rails 14 of standard track. The car 12 has the usual front truck carrying flanged wheels 15, 16, 17, and 18 and rear truck carrying flanged wheels 19, 20, 21, and 22. Each odd-numbered wheel such as the right rear wheel 19 is paired with an opposite wheel of even-number such as wheel 20, and is integrally connected thereto by the customary solid axle 24 between wheels. Spaced apart ties 26 maintain the rails for proper track gage, and the car axles 24 maintain the wheel spacing consistent therewith.

The car mover device 10 comprises a power unit 28 having a frame cantileverly supporting a wheel clamping roller frame in the form of a C-clamp 30. For reasons appearing hereinafter, the C-clamp 30 is specially adapted to be applied by the device to wheel 19 and other odd-numbered wheels as in clamp positions 30a, 30b, and 30c, but not to the wheels indicated by even-numbers in FIG. 1. Depending upon whether the individual cars are empty or not, one or more of the devices 10 can be applied to a string of coupled together cars 12 and operated in unison to move them as a train unit in either direction as indicated by a double headed arrow 32. Placement of the devices 10 can be localized on the first car or two in the string, or distributed along the length of the string, not necessarily applied to every car and not necessarily in corresponding positions on the respective cars 12.

Figure 2:
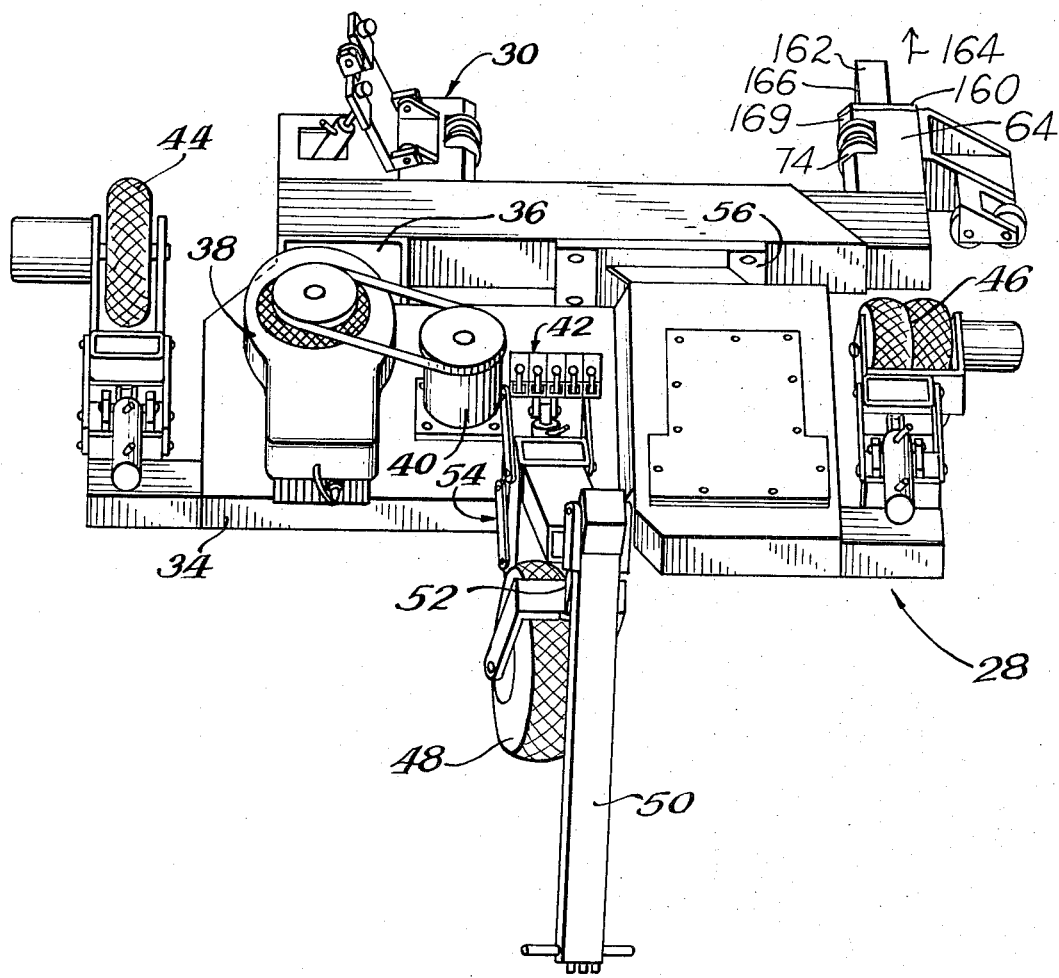
FIG. 2 is a perspective view of the mover only, as shown in top plan and as viewed from the outer side so that the power unit frame thereof is in the foreground and the C-clamp frame is in the background.

Mover Device 10 — FIG. 2

A wheeled frame 34 rendering the power unit mobile carries all components thereof, including a storage battery 36 for engine cranking, for valve solenoid energizing, and for other power unit purposes, an 8 horsepower engine 38 to power the hydraulic system, the hydraulic system pump 40 of which is driven by a belt from the engine 38, and a console 42 housing the valve headers, hand valves, and solenoid valves to control various motors, not shown, included in the hydraulic system. Hydraulics have been found satisfactory as the sole power system.

The frame 34 of the mobile unit has three independent retractable wheel suspensions by which it carries left and right front transport drive wheels 44 and 46, respectively, and another wheel 48 at the rear having a tiller 50. The tiller has means 52 by which it is double pivoted at one end to the third independent wheel suspension 54, so as to turn in horizontal planes about a vertical steering axis for steering the wheel 48, and so as to swing for convenience of the operator in vertical planes all intersecting the vertical steering axis. The drive wheels 44 and 46 are not turnable, but permanently oriented so as to roll in a direction generally transverse to the line of car motion as the unit 28 moves to and fro relative to the selected car wheel.

The C-clamp 30 has a bolted-on connection to an attaching flange 56 on the power frame 34. Consequently, controlled up-and-down movement of the retractable suspensions brings the C-clamp 30 and power unit 28 precisely to the desired level at the top of the rail 14 (FIG. 1).

Structure and Clamping — FIG. 3

In the structure of the C-clamp 30, a fixed frame member of L-shape has a longitudinally extending, long telescoping arm 58 of rectangular tubular cross section and a transverse short jaw arm 60 of rectangular cross section forming a fixed C-frame jaw. A longitudinal extension bracket on the arm 60 carries tandem track rollers 62 affording rolling contact with the rail 14. A movable companion frame member of L-shape has a transverse short, movable jaw arm 64 of preferably rectangular tubular cross section and a long arm 66 of rectangular cross section telescoping longitudinally within and complementarily to the long telescoping arm 58.

The two long arms 58 and 66 form the base leg of the C-clamp and, where they interfit one within another with a boxlike chamber therewithin, they are provided with interface lubricant adapting them for extensible and retractive movement. For that purpose, a concealed, double acting hydraulic cylinder disposed longitudinally in the boxlike chamber comprises a piston rod 68 pivoted at its outer end to the long arm 66 thereabout, and a cylinder 70 receiving the piston or ram end of the rod 68 and pivoted at the cylinder head to the long arm 58 thereabout.

Within its tubular interior, each of the transverse and parallel jaw arms 60 and 64 of the C-clamp carries a rotary hydraulic motor and a grooved drive roller coupled coaxially to the motor shaft, typical of which are the movable arm motor 72 and a V-grooved 1st drive roller 74. A longitudinal extension bracket on the arm 64 carries tandem track rollers 76, affording rolling contact with the rail 14.

If the motor 72 and roller 74 are considered to be at the front for car movement from left to right as viewed in FIG. 3, then the oppositely disposed motor, not shown, and a V-grooved 2d drive roller connected thereto by a first power shaft, not shown, will be at the rear. Also at the rear, pinned to an upright pivot bracket 78 on the fixed jaw arm 60, is an upstanding stabilizer arm 80 affording rolling contact with the car wheel 19 at or about axle level.

After the C-clamp 30 is initially brought into side entry position as shown in plan view in FIG. 1, above and level with the top of the rail 14 and astraddle of the selected car wheel 19 at its respective front and rear, the stabilizer arm 80 is then pivoted into a forwardly tilted, wheel engaging position as shown in solid lines in FIG. 3. Thereafter, retractive operation of the hydraulic power cylinder causes, firstly, collapsing movement of the piston rod 68 and movable arm 64 so that the so called 1st roller 74 will be drawn in from its broken line position, indicated by the broken lines 74a in FIG. 3, into the solid line position shown, and thereby become the first drive roller to engage the wheel 19. Continued retractive operation of the hydraulic power cylinder causes, secondly, limited forward advance of the fixed jaw arm 60 together with the car mover device 10 until the time of approach and engagement of the 2d drive roller, not shown, with the car wheel 19. At this time, the outer end of the mover is supported by the steerable wheel which is turned parallel to the rail to enable the entire car mover 10 to advance as just indicated. At the same time, the existing engagement between the stationary car wheel 19 and stabilizer arm forces the stabilizer arm 80 to yieldably retract, maintaining an upstanding position as at the previous time (for gaging), but at this time in actual straddle contact with the wheel as shown by the broken lines 80a in FIG. 3.

Actually, the tread of the car wheel periphery does not make flat surface contact with either the 1st or the 2nd roller, but rather a standard peripheral radial flange 82 on the wheel 19 provides complementary reentrant angled engagement with the V-grooves in both drive rollers (see roller 74 in FIG. 3) to intensify their interface of frictional contact against wheel slippage. The radial midplane between the sides of each V-groove makes preferably a 45° angle with each such side.

Structure and Unclamping — FIG. 4

In the structure of the stabilizer arm 80, its upright pivot bracket 78 and the referred to longitudinal extension bracket for the rear track rollers 62 are supported on a longitudinal tube 84 of rectangular cross section which forms a right angle prolongation affixed to the fixed jaw arm 60. The track rollers 62 are disposed so as to ride upon the top of the track rail 14, and the previously referred to 2d drive roller indicated at 86 has the groove thereof centered in the plane of the wheel flange 82. A removable end closure plate 87 is secured to the end of the fixed jaw arm 60.

At the top, the arm 80 carries a first stabilizer roller 88 rolling on the outside radial face of the wheel periphery, a second stabilizer roller 90 rolling on the inside radial face of the wheel periphery, and a third roller 92. The third roller 92 is in the plane of the wheel flange 82 and rides on the radial tip thereof throughout both positions previously described during clamping movement of the wheel by the C-clamp. Stabilizer clamping and unclamping are accomplished by a double acting, hydraulically powered stabilizer cylinder 94 operatively pivoted at the rod end to the back of the arm 80 and pivoted at the cylinder end so as to be contained down in the support tube 84.

The arm 80 is thus controlled to pivot in the plane of the car wheel 19. On the side of the wheel opposite to the arm 80, a standard brake shoe 95 is supported for limited movement horizontally to engage the wheel tread and for limited movement vertically away from the rail 14 when desired.

Although the cylinder was unshrouded, at least in one physically constructed embodiment of the invention shown elsewhere in the drawings, it is preferable in actual practice to make provision according to the FIG. 4 showing for a short, apertured frustoconical shroud 96 arranged upright on the top of the support tube 84 and surrounding the lower end of the cylinder 94 for some added protection and more appealing design.

Unclamping from the clamped position described involves disengagement of the 1st roller 74 until drawn clear from the flange 82, disengagement of the 2d roller 86 until drawn clear of the flange 82, and finally retraction of the stabilizer arm itself until clear of the flange 82. Unclamping is done by power in three steps.

The initial step of unclamping the C-clamp from the wheel 19 in FIG. 4 occurs when extension movement of the clamp cylinder, not shown, opens the C-clamp, withdrawing the movable jaw arm, not shown, from the lower front portion of the wheel 19 and rather excessively freeing the 1st drive roller from the wheel flange 82. Next, full hydraulic power on the stabilizer cylinder 94 causes full extension of the cylinder, adjusting the arm 80 as a power arm from the most forwardly advanced, clamped position as shown by the solid lines in FIG. 4, into the broken line, extreme pivoted, kick off position as shown by broken lines 80b in FIG. 4. In that step, not only does the fixed jaw arm 60 retractively move, freeing the 2d drive roller 86 from the wheel 19, but also the entire device 10 similarly moves, all without reengaging the 1st drive roller, not shown. Finally, application of hydraulic power in the circuit serves as the power means causing full foreshortening of the stabilizer cylinder 94, fully retracting the arm into the lowered, free position as shown by broken lines 80c in FIG. 4. The attachment is then free to back away, attended by sidewise movement of the rail rollers 62 and 76, to clear the rail, incident to reverse drive of the power unit 28.

Gaging — FIGS. 3 and 4

Besides the kickoff function described of kicking back the attachment to clear the car wheel, the stabilizer arm 80 is employed for two other functions.

In its second function, the arm 80 along with the rail 14 and wheel 19 is employed by the operator in gaging the position of the C-clamp during its side entry approach from the outer side of a selected car wheel. Firstly, in regard to the level of the track rollers 62 and 76, the operator sets them level using the rail 14 as a visual gage because the rail will block and continue to block entry of the C-clamp until all rollers 62 and 76 clear the rail top. Secondly, in regard to vertical alignment of the rollers, the operator uses the lower outside portion of the wheel 19 as a stop gage because the wheel solidly blocks the C-clamp by engaging it and stopping inward motion of the base thereof at or close to the point at which the rollers 62 and 76 move into the plane of the rail 14. Thirdly, in regard to perpendicularity of the rollers to the top of the rail and, more importantly, perpendicularity of the device 10 to the wheel 19, the operator uses the arm 80 as a gage which is brought by eye into longitudinal registration with the outside face of the wheel 19. At or about the same time, the retractable wheels on the mover are retracted slightly, lowering the mover a limited amount and placing the rail rollers 62 and 76 on the top of the rail 14.

Then the arm 80 is pivoted into rolling contact with the car wheel periphery for the third function, stabilizing or balancing, now to be described.

Stabilization — FIG. 4

Obviously, the stabilizer arm 80 when in rolling engagement on three sides with the adjacent portion of the wheel rim operates to exert a force keeping the device 10 perpendicular to the wheel. But the manner of operation depends upon an overall force system arising due to the particular geometry involved.

For one thing, the respective planes of the rail 14 and the wheel flange 82 are laterally offset by an appreciable amount in the customary range. Hence, the plane of the groove in the 2d drive roller 86, for example, is inwardly or medially offset by that amount from the plane of the track rollers 62, the latter acting somewhat as a leverage fulcrum in the force system. So when the first and second drive rollers 74 and 86 clamp against the lower portion of the wheel flange, the vertical component of their equal forces is exerted as a predetermined lifting effort on the wheel 19, and the drive rollers by a like amount of force react downwardly in the respective jaw arms 60 and 64 about the rail supported rollers 62 and 76 at front and rear of the wheel.

The clamp cylinder bore and cylinder pressure are so selected that the flange lifting effort increases only to a point somewhat before the wheel 19 can lose contact with the top of the rail. Any effort beyond that point deprives the system of traction because friction between the car wheel and rail will unnecessarily reduce. At the same time, the drive roller clamping force provides the necessary friction to rotate the attached wheel 19 and, more importantly, the opposed drive wheel 20 on the rail car. Both wheels 19 and 20 drive, although the unattached wheel 20 is aptly termed herein the drive wheel because it produces by far the predominant portion of the traction effort right on the track.

The discussed downward reaction of the drive rollers 74 and 86 is countered mainly by the weight of the device 10 and to a mentionable degree by the first stabilizer roller 88. That is to say, the rolling of the first roller 88 against the outside of the wheel periphery adds the remaining force necessary to prevent the device 10 from tipping upwardly out of the horizontal plane.

Self evidently, if an appreciably less roller clamping force is used, it will be the second stabilizer roller 90 which will come to bear to some mentionable degree against the wheel periphery (on the inside) to prevent downward tipping of the device out of the horizontal plane.

Specifically at all events, the hydraulic effort of the clamp cylinder manifests itself at each side of the car wheel as a clamping force exerted normal to the lower portion of the wheel flange and the adjacent drive roller at their mutual point of tangency, and the clamping force at each side is preferably limited to about 21,200 pounds (9,600 kg.). Those clamping forces are more than adequate to seat the car wheel flange down against the preferably 45° sides of each receiving roller groove and insure the necessary friction for drive torque transfer. An inside diameter of 3.5 inches (8.9 cm.) in the clamping cylinder and an hydraulic pressure limited to 2,000 pounds per square inch (136 atmospheres) in the cylinder will generate clamping forces of the order described.

The foregoing clamping forces, acting as indicated in a normal direction, together have a vertical component that is exceeded by some amount by the combined weight of the attached car wheel and the load on that car wheel. It is that amount of excess weight which is borne directly by the rail immediately under the car wheel tread. So it follows that a heavily loaded car wheel will have an appreciable portion of the combined car wheel and load weight directly borne by the track rail itself, whereas the balance of such weight will obviously be transmitted from the C-clamp, through the track rollers 62 and 76, and thence into the track rail. Therefore, increases in car gross weight will result in the desired way in increases in the wheel-to-rail friction of the attached car wheel, and the latter will consequently contribute proportionally more to traction drive on the track.

Power Unit — FIG. 5

Because of the variety of in-plant uses and out-plant uses possible with the present mover device, the power unit 28 illustrated is only one preferred form of such units, each of which will carry a uniform attaching flange 56 for the C-clamp. So preferably the C-clamp will be standard for all movers, whereas the movers as manufactured will be offered with a power unit design best suited for the purpose.

In one physically constructed embodiment of the invention, an exposed endless V-belt 98 was provided as illustrated so as to interconnect sheaves atop the engine 38 and pump 40. But the interconnection in actual practice will preferably be made beneath the engine and pump by respective sheaves connected to the latter and by a V-belt trained therebetween, and all located in a concealed position within the hollow interior of the frame 34.

The sidewise location of the third retractable independent wheel suspension 54 places the steerable wheel 48 in an offset or outboard position so as to form a triangulation of points with the two transport drive wheels 44 and 46, for assured stability. The drive wheels 44 and 46 are disposed each at one end of the elongated frame 34 and the swing available from their resulting wide tread renders the power unit minutely adjustable at the individual ends toward and from an adjacent track rail, not shown. Their respective independent suspensions constrain the rotational axes of the drive wheels 44 and 46 so that the planes of rotation of the wheels are fixed and parallel to one another. Reversible hydraulic power motors 100 and 102 carried by the referred to suspensions are connected to the respective wheels 44 and 46 to produce the traction drive.

The wheels 44, 46, and 48 carry pneumatic tires and are all single wheels, except for the right drive wheel 46 which in the illustrated embodiment of our invention is shown as a dual wheel and which if preferred can be a single wheel.

Control members for valving in the hydraulic system of the mover are shown divided, one remotely operated set of which is located on a control panel in the handle end 104 of the tiller and which consists of solenoid switch pushbuttons generally indicated at 106. Another set of control members is pivoted to a multiple stacked valve head 108 which is supported atop a stationary post part 110 of the third independent suspension 54, and which supports individual hand valve levers 112.

At least four of the handle pushbuttons are provided at 106, and at least the two pairs of fluid supply lines, not shown, to the respective transport wheel motors 100 and 102 contain corresponding solenoid valves controlled by the pushbuttons in the tiller handle. The double pivoted end of the tiller 50 enables the tiller to be invertibly swing upwardly past a vertical position and then down into horizontal position at a point adjacent a seat, not shown, on the power unit 28. When occupying that seat, the operator has pushbutton control over the bidirectional, two motor power system and can thus drive and maneuver the unit while aboard it, much in the manner of the steersman of tiller-steered small craft such as the motor whaleboat.

Power Unit Frame — FIG. 6

The unit frame 34, of general T-shape, consists of a main longitudinal section 120 and a transverse tank section 122 secured together in a common horizontal plane, with the section 120 serving as structural shank member of the T-shape and the section 122 serving as a structurally hollow crosspiece member of the T-shape. The tank section 122 is comparatively deep and is sealed so as to be fluid tight. A tank opening 124 in the top receives a cover, not shown, and the hollow interior of the section 122 forms a large hydraulic reservoir in which the fluid in the system is stored.

A mounting opening 126 in the top of the main longitudinal section 120 receives portions of the power unit engine and pump, not shown, which have their bases mounted on the top of the section 120 and secured by hold down studs 128 affixed to the latter.

A longitudinally disposed steel tube constitutes an outrigger 130 forming a prolongation of the main longitudinal section 120 at one corner of the latter, and a similar outrigger 132 is at a corresponding corner of the tank section 122. The outriggers 130 and 132 carry respective fixed post parts 110a and 110b of the end wheel suspensions provided for the drive wheels of which wheel 46 only is actually illustrated.

It will be noted that the fixed post part 110 of the third suspension is offset on one side edge of the section 120 of the frame in a direction opposite to the other post parts. So despite the fact the parts 110, 110a, and 110b are generally aligned on the frame 34, the third suspension and its wheel 48 are definitely outboard for proper three point stance of the mover in leveling itself.

A battery box 134 at the corner of the main section 120 is offset from the same side of the frame 34 as the attaching flange 56 carried by the tank section 122. The parts of the frame generally are steel tubes of varying sizes and rectangular shapes in cross section, and are reinforced at their welded junctures by assorted diagonally disposed flat plates 136 and 138.

Movable Arm Wedge — FIG. 2

We have discovered that the first drive roller 74 in being positioned to reach the wheel flange will encounter interference from the brake shoe standard on some rail cars. The shoe, indicated at 95 in FIG. 4, extends circumferentially to a point fairly close to the lower portion of the car wheel and to the rail but, as previously indicated, the brake shoe mechanism is capable of limited upward movement. The car wheel brakes must be released first, however.

An end closure plate 160 on the movable clamp jaw arm 64 is therefore provided with a downwardly sloping ramp plate or wedge 162 which wedgingly engages the underside of a part of the brake shoe mechanism as the clamp jaw arm 64 is inserted from the outer side of the wheel. Insertion motion, in the direction of the arrow 164 in FIG. 2, causes the wedge 162 to displace the brake shoe mechanism upwardly out of the way, and then the first drive roller 74 freely moves therepast into the plane of the car wheel flange 82.

The displacing force necessary is minor, but nevertheless a part truss reinforces the wedge therebeneath consisting of an upwardly inclining lower stub plate 166 on the closure plate 160 and an interconnecting vertical plate. The eventuality occurs that the movable jaw arm 64 is slightly too low as it is inserted toward the top of the rail 14. In that event, the inclining plate 166 will ride over the rail top and lift the jaw arm to pass across and carry the rail rollers at a level clearing the rail. A taper 169 on the jaw arm 64 is also effective to elevate the brake shoe mechanism when the jaw 64 clamps.

Parallelogram Linkage Suspension — FIG. 7

In the three independent wheel suspensions on power unit 28, the fixed post part indicated by the general reference numeral 110 is secured and braced upright to adjacent structure on the frame 34, and carries a parallelogram suspension linkage which, as illustrated, is typical for all three suspensions. Top links 170 which can be bridged together by a web plate or else left independent, as illustrated, have one length and form the upper control arm of the suspension. Bottom links 172 which are bridged together by an affixed web plate 174 are of the same one length foregoing and form the lower control arm. The upper and lower control arms are connected at one end to the fixed post part 110 to swing up and down about fixed horizontal axes, and are pivotally connected at the other end to a movable post 176 which is always maintained vertical and which swings up and down in a fixed vertical plane.

Accompanying the movable post 176, in its vertical movement in the suspension involved, is a wheel-connected member 178 which, depending on the wheel, is secured thereto with restraining means to hold the wheel for rotation on a fixed axis, or else with dirigible means to afford freedom to the wheel to turn for steering. All wheels are terrain wheels and are either forced into one retracted position as each wheel becomes unneeded, or forced into an indeterminate number of ground positions by which the vehicle levelness and height above ground are established.

The wheel concerned is forced into a vertical position and held there by a double acting power cylinder 180. Two plates forming a cylinder bracket 182 are supported on a closure plate 184 carried at the top of the fixed post part 110, and support the cylinder 180 by a set of trunnions 186 carried by the cylinder. A pivot connection 188 between the lower arm web plate 174 and the rod end of the cylinder affords raising and lowering movement of the suspension in response to foreshortening and extension movement of the cylinder.

In the hydraulic system to be discussed shortly, if a pressure compensated, variable displacement pump is provided according to one preferred form of the invention, the transport wheel requirements and various hydraulic cylinders will allow the pump to operate at full capacity. On the other hand, drive roller power does not require full pump capacity upon start-up of the car but, as static friction is overcome, the required pressure is reduced and the pump adjusts with consequently greater output to move the car at a speed determined by the resistance it offers.

Figure 8:
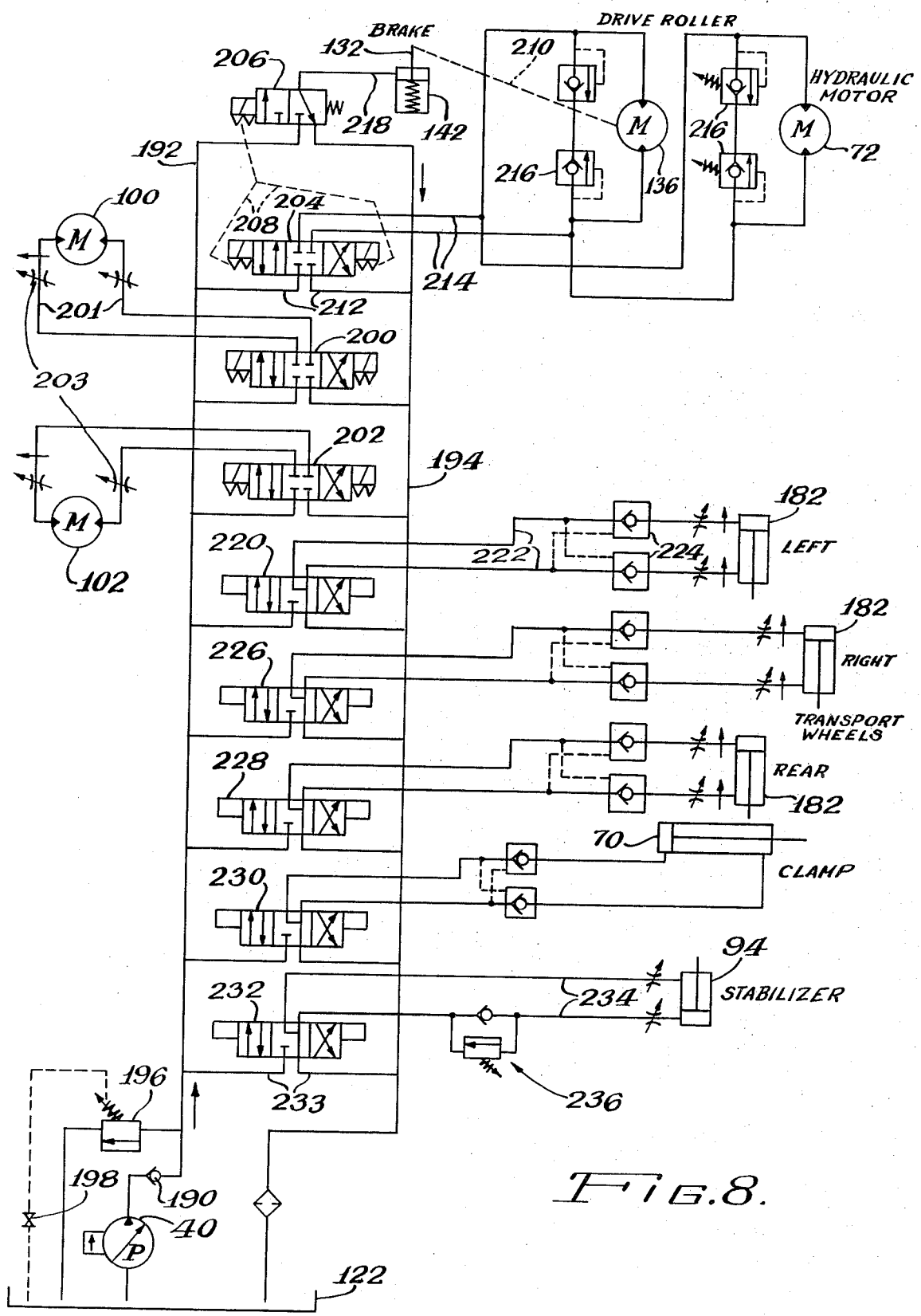
FIG. 8 is a schematic diagram of the hydraulic power circuit of the mover.

Hydraulic Schematic Diagram — FIG. 8

In this diagram, the power unit pump 40 draws hydraulic fluid from the reservoir in the tank section 122 and discharges the fluid under pressure through a check valve 190 into a line pressure line 192. A return line 194 returns the circulating fluid, after use, into the reservoir.

A pump bypass valve 196 piloted by a hand valve 198 is opened to unload the pump when starting the engine, not shown.

A switch-controlled three-position solenoid valve 200 has a pair of solenoid windings controlled by respective forward and reverse pushbutton switches in the tiller handle, not shown. The valve 200 is connected between the line pressure 192 and return 194, and supplies fluid to the left traction motor 100 through supply lines 201 connected to the motor 100.

A similar valve 202 is connected to the right traction motor 102 and to the lines 192 and 194 in similar manner, and is pushbutton controlled to forwardly and reversely operate the motor 102 and right transport wheel in like way. Variable restrictions 203 connected in the supply lines to the reversible motors 102 and 100 enable the operator to set the maximum speed in the forward and reverse directions for the motors.

In case no drive roller brake is provided, a roller motor valve 204 in the system will simply be a hand valve controlled manually.

In any case, however, the roller motor valve 204 is a three-position valve for operating the rear and front drive roller motors 136 and 72. And when a drive roller brake attachment 132 becomes optionally selected equipment on the mover, certain other provisions become necessary. For one thing, the valve 204 is solenoid controlled as illustrated, and push buttons, not shown, are provided on the tiller handle for selectible forward and reverse drive of the first and second wheel drive rollers. The power brake cylinder 142 of the spring applied, pressure released power brake 132 is controlled by a fail safe brake valve 206 provided to afford inherent coordination of brake operation to the existing conditions. For the purpose, a solenoid to operate the valve 206 has contacts forming part of the stacked electrical contacts for each of the forward and reverse solenoids of the valve 204, so that the valve 206 in effect makes parallel connections 208 for coordinate operation.

The fail safe braking condition is sustained as long as neither the forward nor the reverse pushbutton is active which controls the drive solenoid valve 204. For neither of the parallel connections 208 between valves is active at the time, and so an unopposed spring illustrated on the fail safe valve 206 urges the latter to inactive position. Also, the unopposed spring illustrated in the brake cylinder 142 expands and allows the brake 132 to go into brake release position.

Hydraulic dynamic braking also occurs. The drive solenoid valve 204, having input lines 212 between the line pressure and return lines 192 and 194, has supply lines 214 therefrom connecting the first and second drive rollers and motors 136 and 72 hydraulically in parallel. The connections are by branch circuits each including piloted flow-check valves 216. When the piloting pressure is appreciable, under forced running of the motors 136 and 72 to generate flow as pumps while a rail car coasts at a substantial speed, the valves 216 open as direct bypasses to relieve excessive pressure and prevent line rupture. Otherwise, the flow check valves 216 tend to hydraulically lock the motors 136 and 72 from turning whenever the valve 204 is in the neutral blocking position.

For forward running of the rail car by the mover, finger pressure on the forward pushbutton, not shown, causes the switch contacts for the forward solenoid on drive valve 204 and for the solenoid on brake valve 206 to close. The drive valve 204 directs pressure fluid in forward direction through the supply lines to the drive roller motors 136 and 72, and the brake valve 206 connected between the lines 192 and 194 directs fluid through a connection 218 to the brake-releasing, rod end of the brake cylinder 142. The brake on the second drive roller motor 136 releases and simultaneously the drive roller motors 136 and 72 start operating hydraulically in parallel to forwardly drive the rail car, not shown.

Release of the forward pushbutton stops forward drive of the rail car, and braking sets in so that rotation of the car wheels 19 and 20 is arrested. On the other hand, pressure on the reverse pushbutton causes brake release and reverse drive of the rail car which is sustained only as long as the pushbutton pressure is sustained.

A three-position hand valve 220, controlled by one of the valve levers 112, not shown, is connected between the line pressure and return lines 192 and 194. The valve 220 supplies pressure fluid through supply lines 222 to the left transport wheel cylinder 182 for raising and lowering the left front wheel on the power unit, not shown. Piloted check valves 224 individual to the respective lines 222 seat in a direction away from the cylinder 182 and cooperate to lock the cylinder at both ends and prevent unwanted vertical drifting of the left front wheel out of an adjusted position. However, piloting pressure in either line 222 causes the valve 224 in the other line 222 to open, and thus one end of the cylinder 182 can exhaust pressure fluid whenever the other end is receiving pressure fluid from the hand valve 220.

By similar hand valves 226, 228, and 230, and supply lines, and piloted check valves, the respective right and rear wheel cylinders 182 and clamp cylinder 70 are similarly connected to the line pressure and return lines 192 and 194 for adjustment into and locking at the hydraulically taken positions desired.

The stabilizer cylinder 94 has an overcontrol feature. A stabilizer hand valve 232, having input lines 233 between the line pressure and return lines 192 and 194, has supply lines 234 connected to the ends of the stabilizer cylinder 94 enabling advanceable and retractive control over the stabilizer arm, not shown. That is to say, pressure fluid flow into the rod end of the cylinder 94 from one of the supply lines 234 foreshortens the cylinder 94 and retracts the stabilizer arm. Also, an adjustable flow check valve 236 affords an overcontrol in the other supply line 234 so that clamping, already described, can readily force the cylinder 94 to foreshorten and the arm to retract slightly as the wheel flange is being grasped by the second drive roller, not shown, In other words, the flow check valve 236 is set to open only under appreciable pressure and relieve a part of that pressure in the head end of the cylinder 94.

Otherwise, the flow check valve 236, which seats in a direction away from the cylinder 94, blocks the fluid in the head end of the latter and holds the stabilizer arm steadily against the wheel rim portions once the arm rollers, not shown, establish contact therewith.

Transport Operation

The device operates alone with the wheel clamping roller frame disposed in an above-ground position at the front with its open side facing forwardly, and with the left and right front wheels 44 and 46 and third wheel 48 in their wheel-down position. The third wheel 48 is limited to a reasonable angle through which it turns by means of suitably provided stops, not shown.

The engine is started, preferably by electric starter, and fluid pressure is then built up in the line by closing off the pump bypass. The two forward pushbuttons for the left and right transport wheels are moved by hand and held in a depressed position in the tiller handle 104, and the mover proceeds forwardly in the direction determined by tiller position. The tiller swings in a horizontal arc to the rear of the mover as illustrated, if the operator walks on the ground as the mover proceeds on the ground. But the tiller swings in an arc above the mover if the operator inverts same about the double pivoted end and takes the optional seated position aboard the mover. Because either transport wheel can be run reversely or stopped while the other is running forwardly, the mover can turn in an exceptionally small area.

The two reverse pushbuttons, while in depressed position of control over the transport wheels, cause drive of the mover rearwardly on the ground, and steering for straight line or turning movement is accomplished by tiller alone or tiller with independent transport wheel control, as described.

Self power enables the mover to go to and from storage and to and from rail car sites with little effort on the part of the operator, despite several thousands of pounds (kilograms) of total mover weight.

Moving Operation

So as to render the rail car independently movable, the power attachment is brought to the car site with the wheel-clamping roller frame extended or open, with the stabilizer arm in the unpivoted or down position, and with the three retractable wheels on the attachment in wheel-down position. The power attachment is maneuvered so that the roller frame goes about the selected car wheel with the movable jaw arm inserted beneath the brake shoe if present, and between the selected wheel and the next adjacent wheel on the car. The stabilizer arm is then raised to wheel engaging position. Partial retraction of the retractable wheels rests the rollers of the wheel clamping frame on the adjacent track rail.

Then full retraction of the left and right transport wheels on the attachment leaves the attachment essentially on a three point support, with the steerable wheel perpendicular to the ultimate path of car movement. The steerable wheel is then turned parallel to the car path and the clamping roller frame is collapsed so as to cradle the wheel of the car between the drive rollers in the roller frame.

Full retraction of the retractable steerable wheel then leaves the roller frame in a position of providing a three spaced region of rolling support to and by the car wheel, i.e., at the rear location where three rollers are between the car wheel and track rail, the front location where three rollers are between the car wheel and track rail, and the upper location where the three stabilizer arm rollers confront the inner and outer and flange portions of the wheel rim. So the wheel position holds the attachment cantilevered in a stabilized plane without assistance from the now retracted dirigible and left and right transport wheels.

The resulting combination of wheeled rail car and power attachment operates as a vehicle self propelled bidirectionally along the track rails. The operator can leave the attachment secured to the car and move the car at will between differing spots at different times desired. The three consecutive point interengagement of the roller frame rollers with the wheel rim portions establish a stabilized grip, and the purpose is to rotate the car wheel by turning motion of the roller frame rollers. The three points ring the wheel, defining a circle circumscribing the wheel flange 82.

Detaching the power attachment restores it to the other mode of powered mobility. Preliminary to detachment, the steerable wheel is lowered down upon the ground and turned parallel to the path of car movement. The roller frame is adjustably extended by the clamping cylinder so that the movable jaw arm operates as a power arm to unclamp the car wheel, and the stabilizer cylinder is extensibly and then foreshortenably adjusted to clear respectively the roller frame and the stabilizer arm from the rear of the car wheel. Finally, the operator lowers the left and right transport wheels down upon the ground, turns the steerable wheel until it is transverse to the car path, and under power backs the power attachment independently away from the rail car and track.

As herein disclosed, the invention is shown applied to a rail car with the movable jaw arm inserted between adjacent wheels so that the nonselected one of the adjacent wheels is to the right of the selected wheel and the fixed jaw arm is to the left of the selected wheel. It is evident that a simple interchange of the jaw arms, so that each one would be in the position now occupied by the other, will result in a mover clamp of the same design except adapted to clamp the wheel just referred to as the nonselected wheel. Similarly in that eventuality, the car would have four wheels to select from.

What is claimed is:

1. Car mover attachment effective for side entry for establishing cooperation with the wheel of a rail car, comprising:

a C-clamp frame having a series of rail rollers for rolling in a longitudinal direction parallel to the line of car motion;

a power unit frame provided with a connection to the C-clamp frame and having at least two ground-contacting transport wheels for rolling in a direction generally transverse to line of car motion;

another ground wheel spaced apart from the wheels aforesaid to establish cooperation therewith in a triangular ground engaging arrangement mutually providing at least three point rolling support of the attachment on wheels, a plurality of which ground wheels have means controllable so as to raise and lower same, for effecting levelling adjustment of the attachment placing the rail rollers generally aligned to and level with the top of a rail to be contacted; and power means for individually controlling the wheel elevation.

2. The invention of claim 1, characterized by:
   the frame-to-frame connection comprising an attaching flange on the power unit frame, and threaded fasteners detachably securing the C-clamp frame to the attaching flange on the power unit frame.

3. The invention of claim 1,
   said other ground wheel comprising a dirigible wheel to positively steer the attachment on the ground and turnable:
   in a generally transverse direction for rolling support of the attachment in the described way generally transverse to line of car motion, and
   in a generally parallel direction to cooperate with the rail rollers in providing at least three point rolling support of the attachment generally parallel to the line of car motion.

4. The invention of claim 3, said C-clamp frame further having:
   spaced apart stabilizer roller means and first and second rollers, clampable to the car wheel and establishing at least three consecutive point interengagement therewith ringing the wheel in the plane of the wheel whereby, under at least a three-spaced-region rolling support, the wheel position holds the attachment in a stabilized plane independently of the ground wheels.

5. Wheel clamping attachment for a wheeled vehicle, for establishing cooperation with a flanged wheel of the vehicle, comprising:

a C-clamp frame having at least two support rollers oriented with transverse axes for rolling in a longitudinal direction parallel to the line of vehicle travel;

a power unit frame secured to the C-clamp frame having at least two up-down transport wheels oriented with longitudinal axes for rolling primarily in a direction transverse to the line of vehicle travel;

a dirigible wheel carried by one frame, arranged with a spaced apart disposition from the support rollers and from the transport wheels aforesaid, and arranged correspondingly with the rollers and wheels so as to be positioned at the apices of two respective triangles, and with an axis orientable for cooperatively providing at least three point rolling support for the attachment, either in the transverse direction in conjunction with the transport wheels when they are down for mobility, or in the longitudinal direction in conjunction with said frame supporting rollers for mobility when the transport wheels are up; and means for individually controlling the wheel elevation.

6. The invention of claim 5,
   said C-clamp frame having spaced apart stabilizer roller means and first and second rollers, clampable to the vehicle's flanged wheel and establishing at least three-point interengaged contact therewith in a triangular arrangement in the plane of the wheel whereby, under at least a three-spaced-region rolling support, the wheel position holds the attachment in a stabilized plane independently of the dirigible wheel and frame transport wheels.

7. Railway car mover adapted for plural modes of mobility including mobility along the longitudinal line of car travel, said railway car mover having:
   generally horizontally disposed frame means;
   a plurality of rail rollers arranged in the frame means with their axes transverse and supporting the frame means to roll parallel to the line of car travel;
   a plurality of down-and-up movable transport wheels arranged in the frame means with longitudinal axes and supporting the frame means to roll, when steered, generally transverse to the line of car travel;
   a steerable wheel arranged in the frame means, spaced apart both from said transport wheels and from said rail rollers, and arranged with the latter so as to be positioned therewith at the apices of two respective triangles to establish cooperation in providing at least three point rolling support both in conjunction with the transport wheels when they are down and in conjunction with the rail rollers when the transport wheels are up;

means for individually controlling the wheel elevation; and steering means to turn the steerable wheel in a parallel direction when the car mover is being supported for rolling in the described way parallel to said line of travel and to turn the steerable wheel transversely when the car mover is being supported for rolling in the described way generally transverse to said line of travel.

8. The invention of claim 7, said mover further having:

a plurality of wheel rollers by which the flanged wheel of a rail car to be moved is supported at least in part and which are positioned at the apices of a triangle in the plane of the wheel in torque-applying rolling-contact with the latter; and power delivery means having drive connections to a number of the wheels and rollers of the car mover to apply the power to operate same.

9. Self propelled vehicle means for travel on a two-rail track comprising the combination of:

a wheeled rail car having a plurality of wheels, at least a first and second of which wheels have rim flanges and are rigidly interconnected by a load carrying, solid axle, the second one of the interconnected wheels constituting a traction drive wheel on said track;

a power attachment for rendering the rail car self powered, and disposed at the outer lateral side of and confronting the first wheel;

a side entry, wheel clamping roller frame between the first wheel and the attachment and carried in cantilever fashion by the attachment, said roller frame being interpositionable on a rail under the first wheel and establishing rolling contact with the rail, and rolling contact with portions of the rim comprising the rim flange of the first wheel in a ring of at least three point interengagement thereabout forming a triangle of points, whereby to at least partially support the wheel by the flange for rolling travel on the rail and simultaneously to cantileverly support the attachment for conjoint travel in a stable plane; and power means to clamp said frame about the first wheel in the plane of the latter, so as to cause the lifting effort of the desired degree to be exerted and also the countering of the weight of the cantilevered attachment at the outer side of the first wheel by means of frame clamping reaction from the rolling contact with the rim flange.

10. Detachably joined vehicles movable on a horizontal surface, comprising:

a vehicle to be moved having a first wheel on the vehicle joined by an axle at the inner wheel side to a companion spaced apart second wheel on the vehicle, the first wheel having a flange on the rim and the spaced apart second wheel constituting a traction drive wheel;

a mover vehicle disposed at, and confronting the first wheel on, the laterally outer side thereof, and carrying a wheel-clamping dolly frame for attachment between the mover vehicle and first wheel of the vehicle to be moved;

roller means between the dolly frame and first wheel disposed at at least three consecutive points of contact with portions of the rim comprising the flange in a ring conforming to a triangulation of points about the first wheel, rendering the frame effective to at least partially support the first wheel by the flange in rolling contact for rolling movement on the horizontal surface and simultaneously to cantileverly support the mover vehicle for conjoint movement in a stable plane;

power means to clamp said frame about the first wheel in the plane of the latter, for countering the weight of the cantilevered mover vehicle at the outer side of the first wheel by means of frame clamping reaction from the rolling contact with the rim flange;

transport wheels on the mover vehicle having a wheels-up position when the mover vehicle is cantileverly supported as described; and power means to move the transport wheels into wheels-down position on a surface to cantileverly support the weight of the mover vehicle as soon as the frame is unclamped and said cantilevered weight is no longer countered by the frame clamping reaction.

11. The invention of claim 1, further comprising:

power operation means having separate connections for applying power to at least a plurality of said ground wheels independently effective, during operation of each, to set another such wheel selectively in motion of the same direction or at rest or in motion of the opposite direction, especially for close-quarter maneuverability.

* * * * *